United States Patent
Yadav et al.

(10) Patent No.: US 12,333,585 B2
(45) Date of Patent: Jun. 17, 2025

(54) ANOMALY DETECTION FOR BILL GENERATION

(71) Applicants: Oracle International Corporation, Redwood Shores, CA (US); Oracle Financial Services Software Limited, Goregaon (IN)

(72) Inventors: Rahul Yadav, Alwar (IN); Nidhi Rajput, Daman and Diu (IN); Veresh Jain, Bangalore (IN); Krishnapriya Jaya Radhakrishnan, Thiruvananthapuram (IN); Amit Omprakash Rathi, Pune (IN); Saroj Jasmine Merwana, Pune (IN); Aashima Sethi, New York, NY (US)

(73) Assignees: ORACLE INTERNATIONAL CORPORATION, Redwood Shores, CA (US); ORACLE FINANCIAL SERVICES SOFTWARE LIMITED, Goregaon (IN)

( * ) Notice: Subject to any disclaimer, the term of this patent is extended or adjusted under 35 U.S.C. 154(b) by 215 days.

(21) Appl. No.: 17/710,745

(22) Filed: Mar. 31, 2022

(65) Prior Publication Data
US 2023/0196420 A1    Jun. 22, 2023

Related U.S. Application Data

(60) Provisional application No. 63/293,024, filed on Dec. 22, 2021.

(51) Int. Cl.
*G06Q 30/04* (2012.01)
*G06Q 10/10* (2023.01)
(52) U.S. Cl.
CPC ............. *G06Q 30/04* (2013.01); *G06Q 10/10* (2013.01)

(58) Field of Classification Search
CPC ............................... G06Q 30/04; G06Q 10/10
See application file for complete search history.

(56) References Cited

U.S. PATENT DOCUMENTS

2002/0148893 A1* 10/2002 Walsh ................ G06Q 20/105
                                                                  235/380
2012/0221448 A1    8/2012 Evans et al.
(Continued)

FOREIGN PATENT DOCUMENTS

| CN | 110930183 A | 3/2020 |
| FR | 2958773 A1 | 10/2011 |
| WO | 2017007520 A1 | 1/2017 |

OTHER PUBLICATIONS

Brownlee, Jason, "A Gentle Introduction to Mixture of Experts Ensembles", Nov. 2021, https://machinelearningmastery.com/mixture-of-experts/ (Year: 2021).*

(Continued)

*Primary Examiner* — Allen C Chein
(74) *Attorney, Agent, or Firm* — Kilpatrick Townsend & Stockton LLP

(57) ABSTRACT

A bill verification system for verifying bill records associated with an entity account is disclosed. The system receives a request to verify a bill record associated with an entity account. The system identifies a bill level model to be used for verifying the bill record and detects based on the bill level model, bill level anomaly information for the bill record. The system additionally identifies a bill line level model to be used for verifying one or more bill lines in the bill record and detects based on the bill line level model, bill line level anomaly information for the bill record. The system then aggregates the bill level anomaly information and the bill line level anomaly information to generate a bill verification report for the bill record. The system provides (Continued)

the bill verification report as a response to the request received to verify the bill record.

17 Claims, 12 Drawing Sheets

(56) References Cited

U.S. PATENT DOCUMENTS

2013/0339202 A1\* 12/2013 Zhao ................. G06Q 30/04
                                                              705/34
2017/0046700 A1    2/2017 Nandakumar et al.
2020/0118223 A1    4/2020 Singh et al.

OTHER PUBLICATIONS

"Introducing AWS Cost Anomaly Detection (Preview)", Sep. 2020, https://aws.amazon.com/about-aws/whats-new/2020/09/introducing-aws-cost-anomaly-detection-preview/, hereinafter Amazon (Year: 2020).\*

Hadar, "Should I Train a Model for Each Customer or Use One Model for All of My Customers?", 2021, https://towardsdatascience.com/should-i-train-a-model-for-each-customer-or-use-one-model-for-all-of-my-customers-f9e8734d991 (Year: 2021).\*

Byers, The Five Steps of the Claim Adjudication Process, Jul. 2015, https://www.linkedin.com/pulse/five-steps-claim-adjudication-process-jeanne-nicole-byers (Year: 2015).\*

Singhal, Improving invoice anomaly detection with AI and machine learning, Jan. 2021, https://www.ericsson.com/en/blog/2021/1/improving-invoice-anomaly-detection-with-ai-and-machine-learning (Year: 2021).\*

"Anomaly Detection at Accenture", Available Online at: https://www.accenture.com/in-en/case-studies/about/anomaly-detection, Accessed from internet on Aug. 4, 2021, 4 pages.

"Artificial Intelligence in Invoice and Billing Processing", Elorus Blog, Available Online at: https://www.elorus.com/blog/artificial-intelligence-billing-invoice-processing/, Feb. 26, 2020, 8 pages.

Alter, "Anomaly-Precision Payments Brought to Healthcare", Available Online at: https://www.findanomaly.com/#products, Feb. 2020, 17 pages.

Islam et al., "Intelligent Billing System Using Artificial Intelligence", Available Online at: https://bpmi.portal.gov.bd/sites/default/files/files/bpmi.portal.gov.bd/page/bc0f0c3c_c487_463b_8873_6effb42cc584/2020-09-19-00-49-d3f9dcaa92e73d37e08c38c5d6783ba5.pdf, Sep. 2020, pp. 1-61.

Singhal, "Improving Invoice Anomaly Detection with AI and Machine Learning", Available Online at: https://www.ericsson.com/en/blog/2021/1/improving-invoice-anomaly-detection-with-ai-and-machine-learning, Jan. 12, 2021, 7 pages.

\* cited by examiner

FIG. 6

Commercial Banking Invoice

Invoice No. 46333076523
Invoice Date: June 1st, 2020
Period: 05-01-2020 – 05-31-2020

Customer ID: 0072231957
Customer Name: ABC Corp

| Product | Rate | Transaction Volume | Total |
|---|---|---|---|
| Onsite Banker Item Fee | 13 | 15 | 195 USD |
| Inbound Domestic Wire Transfer | 16 | 10 | 160 USD |
| Outbound Domestic Wire Transfer | 14 | 10 | 140 USD (Amount is anomalous as per historical trend) |
| Swift Statement | | | |
| MT940 | 13 | 10 | 130 USD |
| MT940 | 16 | 10 | 160 USD |
| Copy of Statement | 18 | 18 | 324 USD |
| Automated Clearing House | | | |
| Payment per Item Fee | 11 | 15 | 165 USD |
| Returned | 15 | 18 (Volume is anomalous as per historical trend) | 270 USD |
| Reversal | 11 | 11 | 121 USD |
| Sub total | | | 1665 USD |
| Earning Credits | | | (-210) USD |
| Total | | | 1455 USD |
| Previous charge Due | | | 150 USD |
| Payment in Current Period | | | 14.45 USD |
| Adjustments | | | (-900) USD |
| Total Payment | | | 695 USD |

Payment Date: 5th June 2020.
Bill Status: Bill is anomalous due to anomaly at bill line level

Commercial Banking Invoice

Invoice No. 466333076544
Invoice Date: June 1st, 2020
Period: 06-01-2020 – 06-30-2020

Customer ID: 0072231957
Customer Name: ABC Corp

| Product | Rate | Transaction Volume | Total |
|---|---|---|---|
| Onsite Banker Item Fee | 13 | 15 | 195 USD |
| Inbound Domestic Wire Transfer | 16 | 10 | 170 USD |
| Swift Statement | | | |
| MT940 | 13 | 10 | 130 USD |
| MT940 | 16 | 10 | 180 USD |
| Copy of Statement | 18 | 18 | 324 USD |
| Automated Clearing House | | | |
| Payment per Item Fee | 11 | 15 | 165 USD |
| Returned | 15 | 18 | 280 USD |
| Reversal | 11 | 11 | 121 USD |
| Sub total | | | 1665 USD |
| Earning Credits | | | (-210) USD |
| Total | | | 1455 USD |
| Previous charge Due | | | 150 USD |
| Payment in Current Period | | | 14.45 USD |
| Adjustments | | | (-800) USD |
| Total Payment | | | 695 USD |

Payment Date: 5th June 2020.

Bill Status: "Bill is anomalous as a regular billed Product "Outbound Domestic Wire Transfer" is missing"

FIG. 7

Commercial Banking Invoice

Invoice No. 46333076553
Invoice Date: August 1st, 2020
Period: 07-01-2020 – 07-31-2020

Customer ID: 0072231957
Customer Name: ABC Corp

| Product | Rate | Transaction Volume | Total |
|---|---|---|---|
| Onsite Banker Item Fee | 13 | 15 | 195 USD |
| Inbound Domestic Wire Transfer | 16 | 10 | 160 USD |
| Outbound Domestic Wire Transfer | 14 | 10 | 140 USD |
| Demand Draft Charges | 10 | 5 | 50 USD |
| Swift Statement | | | |
| MT940 | 13 | 10 | 130 USD |
| MT940 | 16 | 10 | 160 USD |
| Copy of Statement | 18 | 18 | 324 USD |
| Automated Clearing House | | | |
| Payment per Item Fee | 11 | 15 | 165 USD |
| Returned | 15 | 18 | 270 USD |
| Reversal | 11 | 11 | 121 USD |
| Sub total | | | 1665 USD |
| Earning Credits | | | (-210) USD |
| Total | | | 1455 USD |
| Previous charge Due | | | 150 USD |
| Payment in Current Period | | | 1445 USD |
| Adjustments | | | (-900) USD |
| Total Payment | | | 740 USD |

Payment Date: 5th August, 2020.

Bill Status: Bill is anomalous as new product "Demand Draft Charges" got added in the bill

FIG. 8

Commercial Banking Invoice

Invoice No. 466333076564
Invoice Date: January 1st, 2021
Period: 01-12-2020 – 31-12-2020

Customer ID: 0072231957
Customer Name: ABC Corp

| Product | Rate | Transaction Volume | Total |
|---|---|---|---|
| Onsite Banker Item Fee | 13 | 15 | 195 USD |
| Inbound Domestic Wire Transfer | 16 | 10 | 160 USD |
| Outbound Domestic Wire Transfer | 14 | 20 | 280 USD |
| Swift Statement | | | |
| MT940 | 13 | 10 | 130 USD |
| MT940 | 16 | 10 | 160 USD |
| Copy of Statement | 18 | 18 | 324 USD |
| Automated Clearing House | | | |
| Payment per Item Fee | 11 | 15 | 165 USD |
| Returned | 15 | [26] | 390 USD |
| Reversal | 11 | 11 | 121 USD |
| Sub total | | | 1925 USD |
| Earning Credits | | | (210) USD |
| Total | | | 1715 USD |
| Previous charge Due | | | 150 USD |
| Payment in Current Period | | | 14.45 USD |
| Adjustments | | | (900) USD |
| Total Payment | | | 950 USD |

Payment Date: 5th January 2020.

Bill Status: Bill is normal as rise in Bill Amount and Bill Lines Amount is a seasonal occurring in the month of December

FIG. 9

ANOMALY DETECTION FOR BILL GENERATION

CROSS-REFERENCES TO RELATED APPLICATIONS

The present application is a non-provisional application of and claims the benefit and priority under 35 U.S.C. 119(e) of U.S. Provisional Application No. 63/293,024, filed Dec. 22, 2021, entitled "Anomaly Detection for Bill Generation," the entire contents of which are incorporated herein by reference for all purposes.

BACKGROUND

In today's information world, the ability to efficiently process and generate bills in a timely and accurate manner is essential to the success of an organization and to its users. A bill may be generated per the accumulated usage of various services and products subscribed to by users of the organization. Products bill lines in each billing cycle are then grouped together to generate a complete bill. An essential step in bill generation includes bill verification so that anomalies, if present, in the bill can be detected and rectified before the final bill is generated. For a large organization which has millions of user accounts, the bill verification process can become tedious and challenging especially when a large volume of bills have to be processed within a short span of time.

In certain approaches, bill verification is performed using statistical or rule-based approaches. These approaches can provide useful insights on input data by specifying boundaries (e.g., by using rules, statistical methods or pre-configured thresholds) to detect anomalous patterns in bills. These approaches are, however, limited in their ability to adapt to changing user behavior and cannot effectively learn from historical patterns or new patterns that may appear in the future with new data being added regularly. Thus, there is a constant need to update these rules based on changing user behavior patterns. Moreover, these rules are generally defined by domain experts. If the dataset to be analyzed is small, the domain expert can visually look into the dataset and make decisions regarding anomalous behavior. For large datasets, it is practically not possible for a domain expert to make decisions solely based on visual understanding and such analysis may result in high numbers of false positive alerts and the incorrect flagging of legitimate user behavior as anomalous. There is thus a need for making the processing, including the verification related to bill processing faster and more efficient than is possible in existing implementations.

BRIEF SUMMARY

The present disclosure relates generally to processing bill records. More specifically, but not by way of limitation, this disclosure describes a bill verification system that provides improved capabilities for automatically verifying bill records prior to bill generation so that that anomalies, if present, in the bill record can be detected and rectified before the bill record is generated.

In certain embodiments, a bill verification system for verifying bill records associated with an entity account is disclosed. The system receives a request to verify a bill record associated with an entity account. In certain examples, the bill record may be stored in a memory of the computer system. The entity account may represent a customer (e.g., an enterprise or organization) that subscribes to the bill verification services provided by the bill verification system or may represent an individual user associated with the customer. The system identifies a bill level model to be used for verifying the bill record and detects based on the bill level model, bill level anomaly information for the bill record. The system additionally identifies a bill line level model to be used for verifying one or more bill lines in the bill record and detects based on the bill line level model, bill line level anomaly information for the bill record. The system then aggregates the bill level anomaly information and the bill line level anomaly information to generate a bill verification report for the bill record. The system provides the bill verification report as a response to the request received to verify the bill record.

In certain examples, the bill verification system receives a vector representation to be used for verifying the bill record and uses the vector representation to identify additional anomaly information associated with the bill record. The additional anomaly information identifies one or more missing bill lines in the bill record or one or more incorrectly added bill lines in the bill record. The vector representation is a count of a set of products subscribed to by the entity account.

In certain examples, the bill verification system aggregates the bill level anomaly information, the bill line level anomaly information and the additional anomaly information to generate the bill verification report for the bill record. The bill level anomaly information comprises information about an anomaly detected in the bill record, a cause of the detected anomaly and if the detected anomaly was caused due to a seasonal variation. The bill line level anomaly information comprises information about an anomaly detected at a bill line in the bill record, a cause of the detected anomaly at the bill line and if the detected anomaly at the bill line was caused due to a seasonal variation. The bill line identifies a product or a service used by the entity account.

In certain examples, the bill verification system identifies a set of entity accounts that are similar to the entity account associated with the bill record and then identifies the bill level model to be used for verifying the bill record based on the set of entity accounts. The set of entity accounts are identified by clustering one or more entity accounts based on usage patterns, product subscriptions, regions, usage volumes and billing amount ranges in a set of bill records processed by the system for the entity accounts. In certain examples, the bill verification system identifies a set of entity accounts that are similar to the entity account associated with the bill record and then identifies the bill line level model to be used for verifying the bill record based on the set of entity accounts.

In certain embodiments, the bill verification system comprises a feedback system that is communicatively coupled to the bill verification system that is configured to analyze the bill verification report for the bill record. The feedback system analyses the report and provides a result of the analysis to a training system used by the bill verification system to train a set of models for verifying a set of bill records associated with a set of entity accounts. In certain examples, the set of models include a bill level model to be used for verifying the set of bill records and a bill line level model to be used for verifying the set of bill records.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 6 depicts a simplified diagram of a distributed system for implementing an embodiment.

FIG. 7 is a simplified block diagram of a cloud-based system environment in which functionalities described herein may be offered as cloud services, in accordance with certain embodiments.

FIG. 8 illustrates an exemplary computer system that may be used to implement certain embodiments.

FIG. 9 depicts another example of a bill verification report generated by the bill verification subsystem of the BPS shown in FIG. 1, according to certain embodiments.

DETAILED DESCRIPTION

Figure 1:
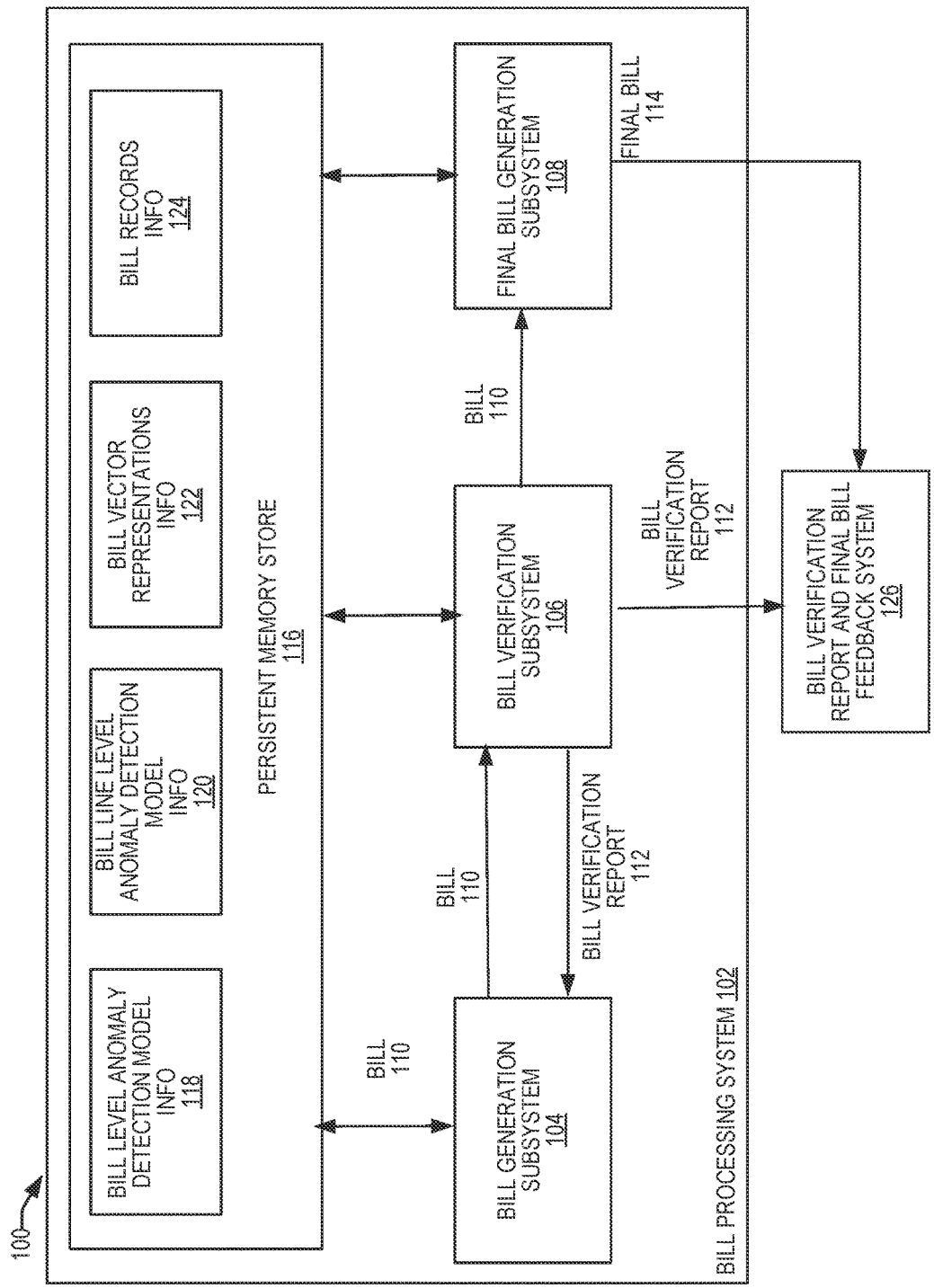
FIG. 1 depicts a computing environment that includes a bill processing system (BPS) providing bill verification and bill generation services, according to certain embodiments.

The present disclosure relates generally to bill processing. More specifically, but not by way of limitation, this disclosure describes a bill processing system that provides improved capabilities for automatically verifying bill records prior to bill generation so that that anomalies, if present, in the bill record can be detected and rectified before the bill is generated.

As previously described, current approaches to bill verification are limited in their abilities to perform efficient and accurate bill verification. The bill verification system described in the present disclosure provides several technical advancements and/or improvements over conventional bill processing systems by identifying and using a set of models that constantly learn from historical user trends to identify anomalies in bills (also referred to herein as bill records) prior to final bill generation. In certain examples, the set of models include bill level models and bill line level models. The bill level models are used to detect anomaly information at the overall bill level for a particular entity account. The bill line level models are used to detect anomaly information at a more granular level, for instance, at the bill line (or product) level in the bill for a particular entity account. A bill may represent a formatted document that comprises multiple lines (items) referred to as "bill lines." Each bill line may identify a product or service used by an entity account and is associated with an amount, where the amount may be determined based upon the product's usage or consumption. In certain examples, an entity account may represent a customer (e.g., an enterprise or organization) who subscribes to the bill verification and bill generation services provided by the system. In other examples, an entity account may represent an individual user associated with the customer. By performing verification at the individual bill line levels in addition to the overall bill level as discussed above, the disclosed system is capable of performing a more granular and adaptive analysis to detect bill anomalies than what is possible by existing bill processing systems.

In certain examples, the set of models (i.e., the bill level models and bill line level models) are trained to analyze historical data representing overall bill level information and bill line level information to identify anomalies that may occur at the overall bill level and/or at the individual bill line levels of the bill for an entity account. The trained models create a spatial distribution of training data points and learn a distribution function of normal data. As anomalies may typically not follow any particular distribution pattern, the models are trained to detect anomalous scenarios when the models find the input bill or components (i.e., bill lines) of the bill to be different from the learned normal distribution of the training data. The trained models evolve over time and adjust according to user feedback provided on the predicted anomalies. The received feedback is used to incrementally improve the accuracy of anomaly prediction by the models. In certain examples, the set of models (i.e., the bill level models and the bill line level models) provide bill level anomaly information and bill line level anomaly information for a bill associated with an entity account. This information may include information about the detected anomaly and a cause of the detected anomaly.

In certain examples, the set of models (i.e., the bill level models and the bill line level models) are trained to detect seasonal trends that may occur at the overall bill level or seasonal trends that may occur at the bill line level in the bill. Seasonal variations, at the overall bill level may occur, for instance, when a bill level feature such as a "bill amount" is higher than usual because of an annually charged product in a billing cycle making this occurrence a seasonal exception. In this case, since the same pattern can be observed in a particular billing cycle (e.g., during holiday season in the month of December) every year, the bill level models are trained to not detect this occurrence as a bill level anomaly. Seasonal variations, in the case of individual bill lines in a bill, may include a bill line level feature such as the "product usage volume" and/or a "product charge" (e.g., a product rate card) being higher than usual in a certain month of the billing cycle every year specifically making it a seasonal exception. In this case, the bill line level models are trained to detect this occurrence as a normal product bill line as the same pattern is observed in this month every year. Additionally, certain transactions have a seasonal pattern that cannot be treated using general threshold values. For example, during holiday season (e.g., in the month of December), each year the bill amount and product consumption may increase for a particular entity account. As this trend is regular, the models do not detect this product bill line as an anomaly.

In certain approaches, the set of models are trained for detecting bill level anomaly information and bill line level anomaly information for a set of contextually similar entity accounts. The set of contextually similar entity accounts may be identified by clustering (segmenting) a set of entity accounts (e.g., individual users within an organization) that have similar usage patterns, product subscriptions, region of account, usage volumes and billing amount ranges.

In certain situations, an anomaly may not be detected at either the product bill line level or at the overall bill level as described above. For example, a similar charge product may be added replacing a regularly occurring product in a bill in a particular billing cycle. This may not be reflected in any of the product bill lines or at the overall bill level but may still represent an anomalous scenario because the similar charge product may not be a product that is typically expected to be included in the particular billing cycle. In certain approaches, the disclosed system may be configured to detect these types of anomalies by generating a vector representation for the bill to be verified. The vector representation is used to identify missing or incorrectly added bill lines in a bill. In a certain implementation, the vector representation is a scaled count of each product used by or subscribed to by users of an organization in a billing cycle. The system uses the vector representation for the bill to identify any bill lines that are missing in the current bill, and/or any bill lines that should be in the current bill but are not in the current bill and identifies these occurrences as anomalies.

In certain examples, a customer may have multiple entity accounts (i.e., users) and every account holder can have a different usage pattern. Since a user's usage pattern is dynamic and can change over time, a single threshold value (or rule) cannot be applied to all users. For instance, an entity account (e.g., a user A) may represent a low budget user who subscribes to only a few products and the user's bill amount may also be on the lower side according to the user's historic trend. Another entity account (user B) may represent a high budget user who subscribes to a large number of products and the user's bill amount may be on the higher side according to the user's historic trend. One threshold (rule) thus cannot fit all trends and applying rule-based approaches in this type of situation may result in bill anomalies being detected for both user A and user B. The disclosed system is capable of detecting user-specific trends and thresholds that can be dynamically adjusted by the bill level models and the bill line level models that constantly learn from historical data associated with bills for each entity account or for a set of contextually similar entity accounts. Additionally, when bills are processed at a huge scale (e.g., in the case of a customer which has millions of user accounts), the performance overhead for scrutinizing these many bills becomes a challenge. The disclosed system accelerates the process of bill verification by performing batch processing of bills to process the bills in parallel to reduce the overall time of anomaly prediction for all billing accounts and provide accurate and on-time bill generation.

Referring now to the drawings, FIG. 1 depicts a computing environment that includes a bill processing system (BPS) providing bill verification and bill generation services, according to certain embodiments. The BPS 102 may be implemented by one or more computing systems that execute computer-readable instructions (e.g., code, program) to implement the BPS. As depicted in FIG. 1, the BPS 110 includes various subsystems including a bill generation subsystem 104, a bill verification subsystem 106 and a final bill generation subsystem 108. Portions of data or information used by or generated by BPS 102 as part of its processing may be stored in a persistent memory store 116. The systems and subsystems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

The BPS 102 may be implemented in various different configurations. In certain embodiments, the BPS 102 may be implemented on one or more servers of a cloud provider network and its bill generation and bill verification services may be provided to subscribers of cloud services on a subscription basis. Computing environment 100 depicted in FIG. 1 is merely an example and is not intended to unduly limit the scope of claimed embodiments. One of ordinary skill in the art would recognize many possible variations, alternatives, and modifications. For example, in some implementations, the BPS 102 can be implemented using more or fewer subsystems than those shown in FIG. 1, may combine two or more subsystems, or may have a different configuration or arrangement of subsystems.

In the depicted embodiment, information related to bill verification and bill generation may be stored in a persistent memory store 116 of the BPS 102. This information may include information related to a set of bill level anomaly detection models 118, a set of bill line level anomaly detection models 120, a set of vector representations 122 representing product usage data by individual users of an organization and a set of bill records 124 representing bills being processed by the BPS 102 for bill verification and final bill generation. Details of the information stored in the persistent memory store 116 is described in detail below. The persistent memory store 116 may represent a memory location that is local to the BPS 102, or may represent a memory location that is remote from the BPS 102 and accessible via one or more communication networks, or it may represent a combination of local and remote locations.

In the depicted embodiment, the bill generation subsystem 104 generates billing data for an entity account. The billing data that is generated for an entity account comprises information identifying one or more bill lines (also referred to as bill line items), where a bill line item corresponds to a product or service comprising its own associated item billing data. The billing data that is generated for an entity account is thus an aggregation of the item billing data for the individual bill line items. In certain examples, the billing data may be stored in a memory object (for e.g., in a bill record) in the bill records information data store 124. The billing data represents an in-memory representation of a bill (also referred to herein as a bill record) to be sent to the entity account. The entity account may represent a customer (e.g., an enterprise or organization) who subscribes to the bill verification and bill generation services provided by the BPS 102 or an entity account may represent an individual user associated with the customer. The bill verification subsystem 106 obtains a bill (i.e., a bill record) 110 stored in the bill records data store 124 and processes the bill to detect if there are anomalies, if present, in the bill. Based on the processing, the bill verification subsystem 106 generates a bill verification report 112 for the bill. The bill verification report 112 may include information regarding anomalies detected at the bill level, anomalies detected at the bill line and or seasonal anomalies associated with the bill. Additional details of the information comprised in the bill verification report 112 is described in FIG. 2. In certain examples, the bill verification report 112 may be stored in the bill records information data store 124.

In certain examples, the bill verification subsystem 106 may transmit the bill verification report 112 back to the bill generation subsystem 104. Based on the results of the bill verification report 114, in certain cases, the bill generation subsystem 104 may regenerate the bill. For instance, if the bill verification report 114 indicates that the verification of the bill is incomplete, the bill generation subsystem 104 may regenerate the bill. The bill verification subsystem 106 may then perform verification of the newly generated bill. Once the verification process is complete, the bill verification subsystem 106 transmits the bill 110 to the final bill generation subsystem 108 which, in turn, formats the bill to generate a final bill 114. The final bill 114 may be stored in the bill records information data store 124. Additional details of the processing performed by the subsystems 104, 106, and 108 of the BPS 102 is described in detail in FIG. 2.

In certain embodiments, the bill verification report 112 or the final bill 114 may further be analyzed by a bill verification report and final bill feedback system 126. The bill verification report and final bill feedback system 126 may be of various types, including but not limited to, a mobile phone, a tablet, a desktop computer, and the like. In certain examples, the system 118 may represent an automated system that is communicatively coupled to the BPS 102 possibly via a public network (e.g., the Internet). The system 126 may be an external system that is configured to provide services to automatically perform the analysis of the bill verification report 112 or the final bill 114 and based on the analysis transmit feedback to a training system used by the bill processing system 102 to train a set of bill level models and bill line level models that perform bill anomaly prediction. The training system may utilize the received feedback to incrementally improve the accuracy of anomaly prediction by the bill level models and the bill line level models. Additional details of the training of bill level models and bill line level models by the training system used by the BPS 102 is described in FIG. 3. In other examples, the system 126 may represent a computing device of a user (e.g., an administrator) of the BPS 102. The user may interact with the BPS 102 using a browser of the system 118 and provide feedback regarding the bill verification report 114 or the final bill 116 to the BPS 102 which may in turn transmit the feedback to the training system. In some other examples, the system 126 may represent a computing device of an entity account (e.g., an organization, an enterprise, or an individual) who subscribes to the services provided by the BPS 102. A user of the device may interact with the BPS 102 using a browser of the user device and provide feedback regarding the bill verification report 114 or the final bill 116 to the BPS 102 which may then transmit the feedback to the training system.

Figure 2:
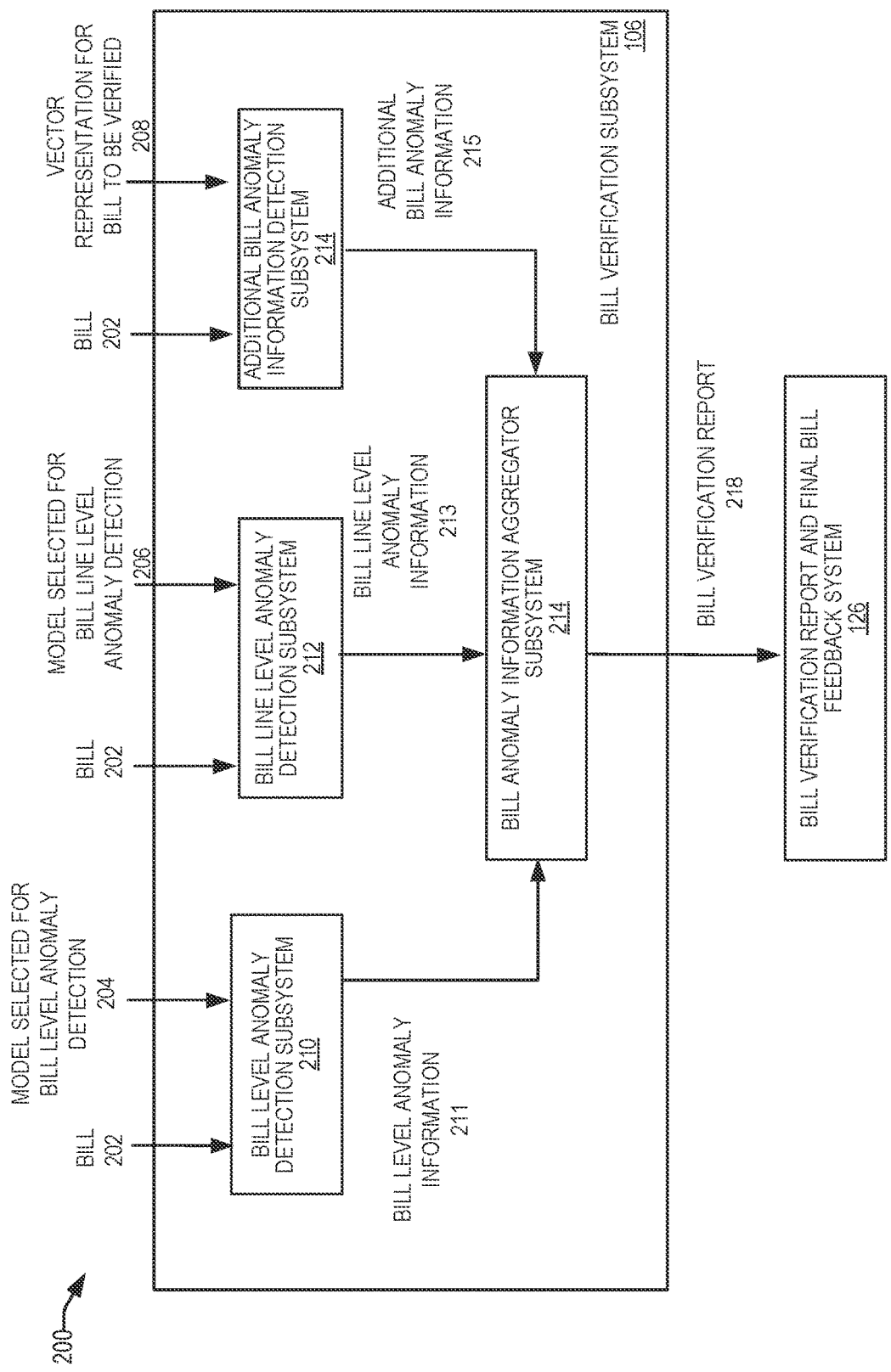
FIG. 2 depicts various subsystems of the bill verification subsystem shown in FIG. 1 for performing bill verification, according to certain embodiments.

FIG. 2 depicts various subsystems of the bill verification subsystem 106 shown in FIG. 1 for performing bill verification, according to certain embodiments. In the depicted embodiment, the subsystems for performing bill verification include a bill level anomaly detection subsystem 210, a bill line level anomaly detection subsystem 212, an additional bill anomaly information detection subsystem 214 and a bill anomaly information aggregator subsystem 214. The subsystems depicted in FIG. 2 may be implemented using software (e.g., code, instructions, program) executed by one or more processing units (e.g., processors, cores) of a computing system, hardware, or combinations thereof. The software may be stored on a non-transitory storage medium (e.g., on a memory device).

As described in FIG. 1, the bill verification subsystem 106 receives a request to verify a bill (i.e., a bill record) from the bill generation subsystem 104 to detect anomalies, if present, in the bill. The bill verification subsystem 106 may be configured to detect various types of bill anomalies. In a certain implementation, the bill level anomaly detection subsystem 210 in the bill verification subsystem 106 may be configured to detect any anomalies, if present, at the overall bill level. As part of the overall bill level verification process, the bill level anomaly detection subsystem 210 receives a request to verify a bill 202 and identifies a model 204 to be used for performing bill level anomaly detection. The process of identifying a model to be used for performing bill level anomaly detection is described in FIG. 5. The bill level anomaly detection subsystem 210 then uses the model 204 identified for performing verification at the overall bill level to detect, bill level anomaly information 211, if present, in the overall bill 202. In certain examples, the bill level anomaly information 211 may include information about the detected anomaly, a cause of the detected anomaly and if the detected anomaly is caused due to a seasonal variation. Seasonal variations, in this case, may include a bill level feature such as a "bill amount" being higher than usual because of an annually charged product in a billing cycle making this occurrence a seasonal exception. In this case, since the same pattern may be observed in a particular billing cycle (e.g., during holiday season in the month of December) every year, the bill level anomaly detection subsystem 210 may not detect this occurrence as a bill level anomaly.

In addition to anomalies detected at the overall bill level as described above, the bill verification subsystem 106 may also be configured to detect anomalies, if present, at individual product bill lines of the bill. In a certain implementation, the bill line level anomaly detection subsystem 212 in the bill verification subsystem 106 may be configured to detect any anomalies, if present, at the individual product bill lines of the bill. As part of the bill line level verification process, the bill line level anomaly detection subsystem 212 receives a request to verify a bill 202 and identifies a model 206 to be used for performing bill line level anomaly detection. The process of identifying a model to be used for performing bill line level anomaly detection is described in FIG. 5. The bill line level anomaly detection subsystem 212 then uses the model 206 identified for performing verification at the bill line level to detect bill line level anomaly information 213 for the bill 202. In certain examples, the bill line level anomaly information 213 may include information about the detected anomaly at a particular bill line, a cause of the detected anomaly and if the detected anomaly is caused due to a seasonal variation. Seasonal scenarios, in this case, can include a bill line level feature such as the "product usage volume" and/or a "product charge" (e.g., a product rate card) being higher than usual in a certain month of the billing cycle every year specifically making it a seasonal exception. In this case, the bill line level anomaly detection subsystem 212 may detect this occurrence as a normal product bill line as the same pattern is observed in this month every year. Additionally, certain transactions have a seasonal pattern that cannot be treated using general threshold values. For example, during holiday season (e.g., in the month of December), each year the bill amount and product consumption may increase for a particular entity account. As this trend is regular, the bill line level anomaly detection subsystem 212 does not detect this product bill line as an anomaly. Thus, by performing verification at the bill line level as discussed above, the disclosed bill verification system 106 is capable of performing a more granular and adaptive analysis to detect bill anomalies than what is possible by existing bill processing systems.

In certain situations, an anomaly may not be detected at either the product bill line level or at the overall bill level as described above. For example, a similar charge product may be added replacing a regularly occurring product in a bill in a particular billing cycle. This may not be reflected in any of the product bill lines or at the overall bill level but may still represent an anomalous scenario because the similar charge product may not be a product that is typically expected to be included in the particular billing cycle In certain approaches, the bill verification subsystem 106 may be configured to detect these types of anomalies by identifying missing products (bill lines) in the bill, identifying incorrectly added bill lines in the bill or identifying the addition of a new product (bill line) in the bill in a particular billing cycle. In a certain implementation, this type of bill verification and anomaly detection is performed by the additional bill anomaly information detection subsystem 214. The subsystem 214 receives a bill (e.g., 202) to be verified and selects a vector representation 208 for the bill to be verified. The vector representation for a bill is used to identify missing or incorrectly added bill lines in a bill. In a certain implementation, the vector representation is a count of each product used by or subscribed to by users of an organization in a billing cycle and may be represented as shown below:

P=[p1, p2, p3, . . . , pn]
where [p1, p2, P3 . . . pn] represents the respective count of all the n products available in an input dataset.

In a certain implementation, the additional bill anomaly information detection subsystem 214 may be configured to generate a vector representation for each billing cycle in which a bill is generated. For instance, if a bill is generated on a monthly basis, a vector representation may be generated for each month (January, February, March . . . December) based upon identifying a set of products that is to be expected to be included for that month. This set of products may be identified by analyzing historical bill information associated with the bills generated for a set of users for that month. For example, if a set of products (p1, p2, p3, p4, p5) are expected to be included in a December billing cycle, then the vector representation for the billing cycle for the month of December will have bits for p1 through p5 set to one, and the other bits set to zero. The set of bits that are set to one in a vector representation represent the "expected" products to be included for the bill in a particular billing cycle.

As part of the verification process, the additional bill anomaly information detection subsystem 214 receives a request to verify a bill 202 and selects a vector representation 208 for the bill to be verified. For instance, the selected vector representation 208 may correspond to the vector representation that is associated with the billing cycle (i.e., the month) in which the bill is generated. The additional bill anomaly information detection subsystem 214 uses the selected vector representation for the bill to identify any bill lines that are missing in the current bill and identifies these occurrences as anomalies. In certain examples, the additional bill anomaly information 215 detected by the subsystem 214 may include information about the detected anomaly at the bill line, a cause of the detected anomaly and if the detected anomaly is caused due to a seasonal variation. Seasonal scenarios, in this case, can occur when for an entity account, a product bill line in the bill is dropped, e.g., the product is free for that particular billing cycle (i.e., month) and so cannot be charged and mentioned in the bill whereas another product which does not occur generally is added (since it is annually charged product that is applied to the bill during that particular billing cycle). In this case, since this is a seasonal exception, the subsystem 214 may detect this occurrence as non-anomalous in the bill.

The bill anomaly information aggregator subsystem 214 is configured to aggregate information (e.g., 211, 213, 215) for all the anomalies detected for the bill and generate a bill verification report 218 that comprises the aggregated anomaly information. Examples of various types of bill verification reports that are generated by the bill verification subsystem 106 are described in FIGS. 6-9. In certain examples, and as described in FIG. 1, the bill verification report 218 may further be analyzed by a bill verification report and final bill feedback system 126. The system 126 may provide information regarding feedback on the verification report to a training system used by the bill verification system to train the bill level models and the bill line level models.

Figure 3:
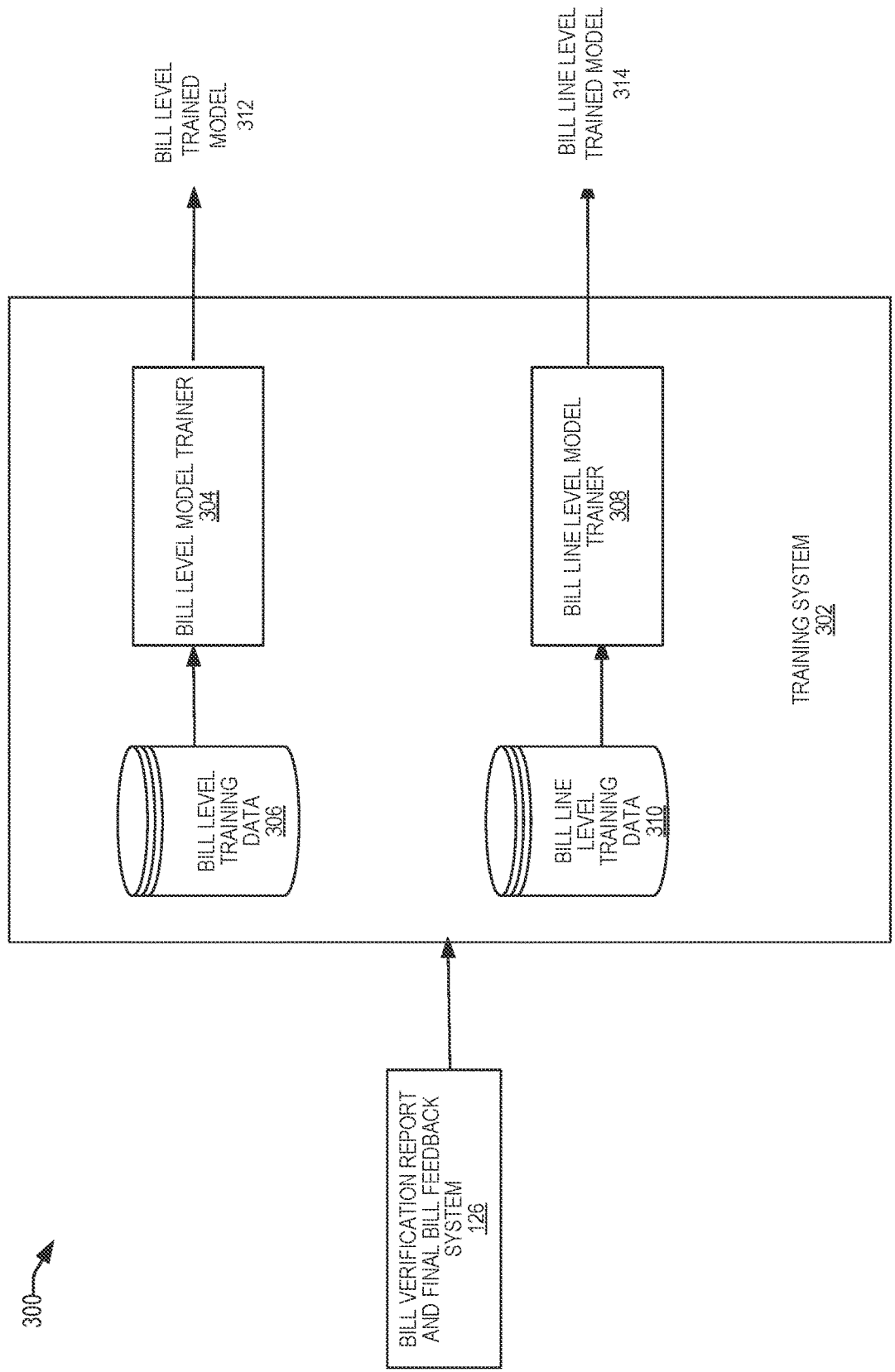
FIG. 3 depicts a training system used by the BPS shown in FIG. 1 for training a set of models for detecting bill anomaly information, in accordance with certain embodiments.

FIG. 3 depicts a training system used by the BPS 102 for training a set of models for detecting bill anomaly information, in accordance with certain embodiments. The training system 302 may represent a system within the BPS 102 shown in FIG. 1, or may represent a system (or an external service) that is remote from (or external to) the BPS 102 and accessible via one or more communication networks, by the subsystems of the BPS 102. In the depicted embodiment, the training system 302 includes a bill level model trainer 304 and a bill line level model trainer 308. The subsystems depicted in FIG. 2 may be implemented using software (e.g., code, instructions, program) executed by one or more processing units (e.g., processors, cores) of a computing system, hardware, or combinations thereof. The software may be stored on a non-transitory storage medium (e.g., on a memory device).

In certain embodiments, the bill level model trainer 304 is configured to train a set of bill level models to predict/detect anomalies at the overall bill level. The set of models used by the bill level model trainer 304 may include, but are not limited to, supervised learning models such as support-vector machine (SVM) models, unsupervised learning models, one class SVM classifiers that can perform both supervised and unsupervised learning respectively and so on. In certain approaches, the bill level model trainer 304 may be configured to identify and train a model to be used for detecting bill level anomaly information for a particular entity account. As previously described, an entity account may represent a customer (e.g., an enterprise or organization) who subscribes to the bill verification and bill generation services provided by the BPS 102 or may represent an individual user associated with the customer. In other approaches, the bill level model trainer 304 may be configured to identify and train a model to be used for detecting bill level anomaly information for a set of contextually similar entity accounts. In certain embodiments, the set of contextually similar entity accounts may be identified by clustering a set of entity accounts (e.g., individual users within an organization) that have similar usage patterns, product subscriptions, region of account, usage volumes and billing amount ranges. The set of contextually similar entity accounts may be identified automatically by a subsystem (e.g., the bill verification subsystem) within the BPS or may be identified by a user of the BPS 102.

The bill level model trainer 304 uses bill level training data 306 to train a model (e.g., an SVM model) to predict anomalies at the overall bill level for an entity account or for a set of contextually similar entity accounts as described above. In certain examples, the bill level training data 306 may include information related to historical data of bills associated with entity accounts, a set features at the bill level and information related to a set of contextually similar entity accounts. Features at the bill level may include, but are not limited to, the billing date, billing window, billing cycle, bill amount, product count, account details, account id and the like. The bill level model trainer 304 trains the model using the historical data. The model creates a spatial distribution of training data points and learns a distribution function of the normal data. The model identifies anomalous data points. As anomalies may typically not follow a particular distribution pattern, they can be even random noises so the model targets to fit the normal scenarios and the anomalous scenarios are detected when the model finds the input bill to be different from the learned normal distribution of the training data. Then, the model looks at data point characteristics and identifies the bill level features that lead the bill to be anomalous. For instance, if the bill amount was identified by the model to be anomalous, the model may identify that the "bill amount" feature was the feature that caused the bill to be anomalous. The trained model also takes into consideration seasonal exceptions that occur at the overall bill level. As previously described, seasonal exceptions at the overall bill level may include a bill level feature such as a "bill amount" being higher than usual because of an annually charged product or annual charges applied to the bill making it a seasonal exception. The bill level model trainer 304 then provides the bill level trained model 312 to the BPS 102. In certain examples, the bill level trained model 312 is stored in the bill level anomaly detection model information data store 118 in the BPS 102.

The bill line level model trainer 308 uses bill line level training data 310 to train a model (e.g., an SVM model) to predict anomalies at the individual bill line levels of the bill for an entity account or for a set of contextually similar entity accounts as described above. In certain examples, the bill line level training data 310 may include information related to historical data of product bill lines associated with entity accounts, a set of features at the bill line level and information related to a set of contextually similar entity accounts. Features at the bill line level may include, but are not limited to, the product type, product name, billing date, billing cycle, product amount, product usage volume, product rate card, product charging attributes, account id and the like. The bill line level model trainer 308 trains model using the historical data pertaining to product bill lines. The model creates a spatial distribution of training data points and learns a distribution function of the normal data. The model identifies anomalous data points. As anomalies may typically not follow a particular distribution pattern, they can be even random noises so the model targets to fit the normal scenarios and the anomalous scenarios are detected when the model finds the input bill to be different from the learned normal distribution of the training data. Then, the model looks at data point characteristics and identifies the bill line level features that lead the bill to be anomalous. For instance, if the amount of a product A in the bill was identified by the model to be anomalous, the model may identify that the "product amount" feature was the feature that caused the bill line to be anomalous. The trained model also takes into consideration seasonal exceptions that occur at the overall bill line level. As previously described, seasonal exceptions at the bill line level may include a bill line level feature such as the "product usage volume" and/or a "product charge" (e.g., a product rate card) being higher than usual in a certain month of the billing cycle every year specifically making it a seasonal exception. The bill line level model trainer 308 then provides the bill line level trained model 314 to the BPS 102. In certain examples, the bill level trained model 314 is stored in the bill line level anomaly detection model information data store 120 in the BPS 102.

In certain embodiments, the bill level model trainer 304 and the bill line level model trainer 308 may be configured to receive feedback regarding the bill verification report 112 or the final bill 114 from the bill verification report and final bill feedback system 126 (shown in FIG. 1). The level model trainer 304 and the bill line level model trainer 308 may utilize the received feedback to incrementally improve the accuracy of anomaly prediction by the bill level models and the bill line level models. For instance, the feedback may identify that a particular bill line in the bill was incorrectly detected as anomalous by a bill level model in the training system. This information (i.e., feedback) may be stored in the bill line level training data store 310. The bill line level model trainer 308 may use the updated information stored in the data store 310 to re-train its model. For instance, the trainer 308 may re-train its supervised SVM model with updated labels and re-train its unsupervised One-class SVM model by updating the Nu parameter (which is an upper bound in the fraction of outliers in the training dataset). Thus, the received feedback may be used to incrementally improve the accuracy of anomaly prediction by retraining the existing supervised and unsupervised bill line level models.

Figure 4:
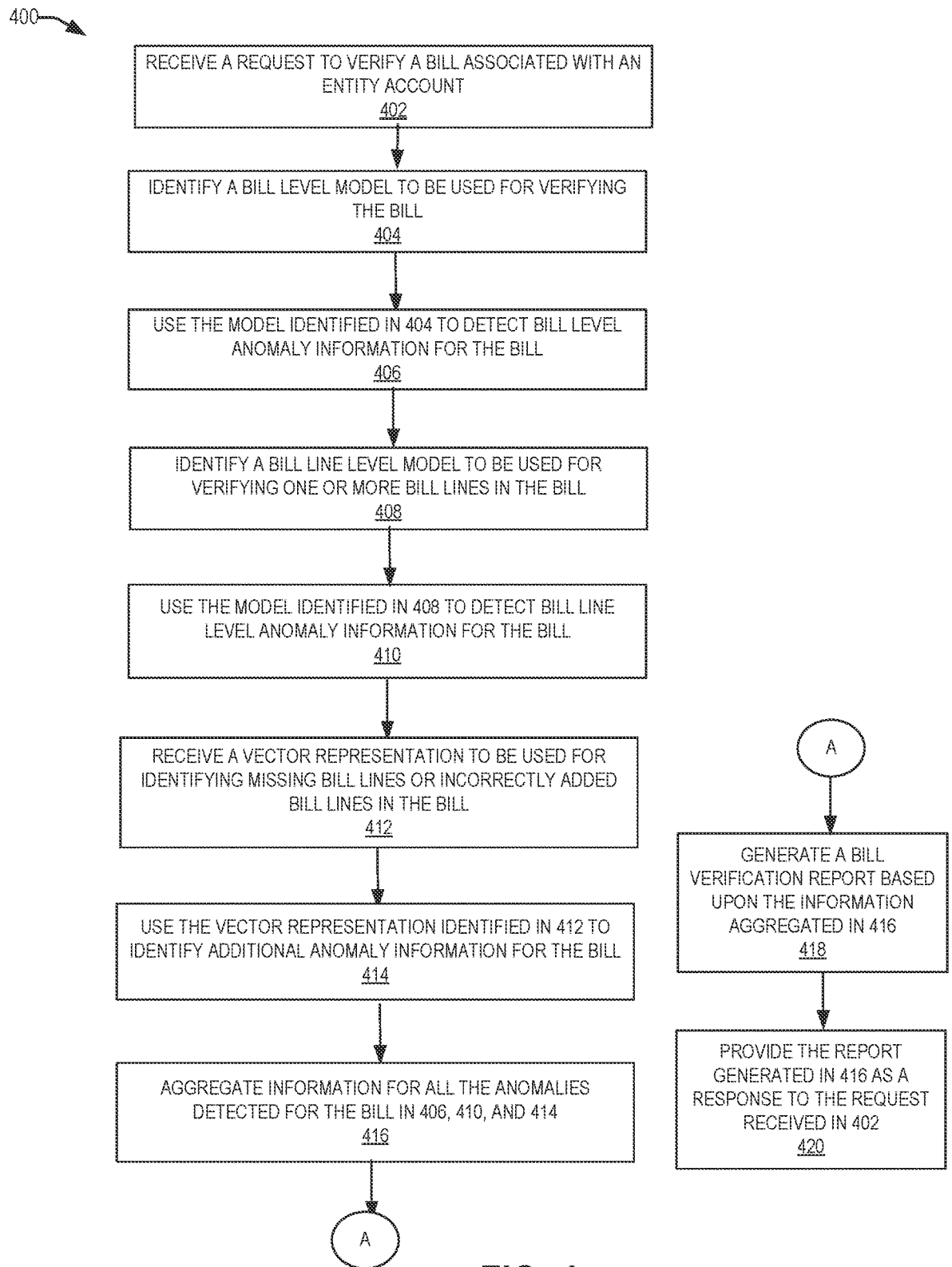
FIG. 4 depicts an example of a process performed by one or more subsystems of the bill verification subsystem shown in FIG. 1 for performing bill verification, according to certain embodiments.

FIG. 4 depicts an example of a process 400 performed by one or more subsystems of the bill verification subsystem shown in FIG. 1 for performing bill verification, according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 4 may be performed by the bill level anomaly detection subsystem 210, the bill line level anomaly detection subsystem 212, the additional bill anomaly information detection subsystem 214 and the bill anomaly information aggregator subsystem 214 in the bill verification subsystem 106.

The processing depicted in FIG. 4 may be initiated when, at block 402, the bill verification subsystem 106 receives a request to verify a bill record (also referred to herein as a bill) associated with an entity account. As previously described, an entity account may represent a customer (e.g., an enterprise or organization) who subscribes to the bill verification and bill generation services provided by the BPS 102 or an entity account may represent an individual user associated with the customer.

At block 404, the bill level anomaly detection subsystem 210 identifies a bill level model to be used for verifying the bill record at the overall bill level. The process of identifying a model to be used for performing bill level anomaly detection is described in FIG. 5.

At block 406, the bill level anomaly detection subsystem 210 uses the model identified in 404 to detect bill level anomaly information for the bill record. As previously described, the bill level anomaly information (e.g., 211) may include information about the detected anomaly, a cause of the detected anomaly and if the detected anomaly is caused due to a seasonal variation.

At block 408, the bill line level anomaly detection subsystem 212 identifies a bill line level model to be used for verifying one or more bill lines in the bill record. The process of identifying a model to be used for performing bill line level anomaly detection is described in FIG. 5.

At block 410, the bill line level anomaly detection subsystem 212 uses the model identified in 408 to detect bill line level anomaly information for the bill record. As previously described, the bill line level anomaly information (e.g., 213) may include information about the detected anomaly at a particular bill line, a cause of the detected anomaly and if the detected anomaly is caused due to a seasonal variation.

At block 412, the additional bill anomaly information detection subsystem 214 receives a vector representation to be used for identifying missing bill lines or incorrectly added bill lines in the bill record. As previously described in FIG. 2, the vector representation may represent a scaled count of occurrences of each product used by or subscribed to by users of an organization.

At block 414, the additional bill anomaly information detection subsystem 214 uses the vector representation identified in 412 to identify additional anomaly information for the bill record. For instance, as described in FIG. 2, the vector representation may correspond to the vector representation that is associated with a particular billing cycle (i.e., month) in which the bill record is generated. The additional bill anomaly information detection subsystem 214 uses the vector representation for the bill to identify any bill lines that are missing in the current bill record, and/or any incorrectly added bill lines in the current bill and identifies these occurrences as anomalies.

At block 416, the bill anomaly information aggregator subsystem 214 aggregates the information for all the anomalies detected for the bill in 406, 410 and 414 and at block 418, the bill anomaly information aggregator subsystem 214 generates a bill verification report for the bill record based upon the information aggregated in 416.

At block 420, the bill anomaly information aggregator subsystem 214 provides the report generated in 416 as a response to the request received in 402. In certain examples, and as described in FIG. 1, bill verification report 218 may further be analyzed by a bill verification report and final bill feedback system 126. The system 126 may provide information regarding feedback on the verification report to a training system (e.g., 302) used by the bill verification system to train the bill level models and the bill line level models.

Figure 5:
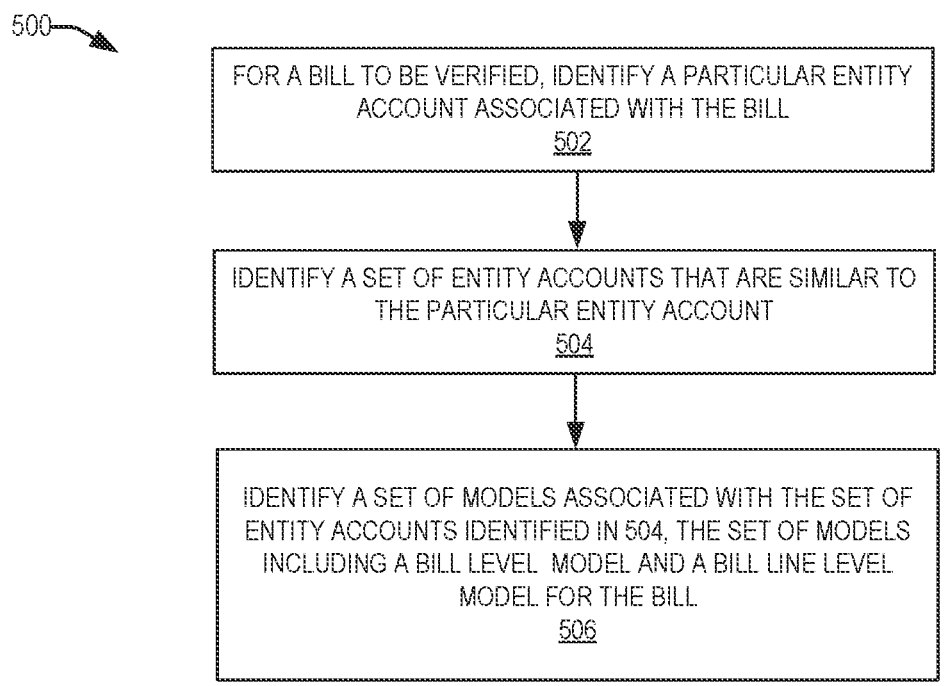
FIG. 5 depicts an example of a process performed by one or more subsystems of the bill verification subsystem shown in FIG. 1 for identifying a set of models to be used for performing bill level anomaly detection and bill line level anomaly detection, according to certain embodiments.

FIG. 5 depicts an example of a process 500 performed by one or more subsystems of the bill verification subsystem shown in FIG. 1 for identifying a set of models to be used for performing bill level anomaly detection and bill line level anomaly detection, according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 500 presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 5 may be performed by the bill level anomaly detection subsystem 210 and the bill line level anomaly detection subsystem 212 in the bill verification subsystem 106.

The processing depicted in FIG. 5 may be initiated when, at block 502, the subsystems 210 and 212 in bill verification subsystem 106 receive a request to verify a bill (i.e., a bill record) associated with an entity account and identify the particular entity account associated with the bill. As previously described, an entity account may represent a customer (e.g., an enterprise or organization) who subscribes to the bill verification and bill generation services provided by the BPS 102 or an entity account may represent an individual user associated with the customer.

At block 504, the subsystems 210 and 212 identify a set of entity accounts that are similar to the particular entity account identified in 502. In certain examples, the set of entity accounts include a set of contextually similar entity accounts that may be identified by clustering a set of entity accounts (e.g., individual users within an organization) that have similar usage patterns, product subscriptions, region of account, usage volumes and billing amount ranges. The set of contextually similar entity accounts may be identified automatically by a subsystem (e.g., the bill verification subsystem) within the BPS or may be identified by a user of the BPS 102. In certain examples, information about contextually similar entity accounts may be stored as part of the bill level training data 306 and the bill line level training data 310 in the training system 302 used by the BPS 102.

At block 506, the subsystems 210 and 212 identify a set of models associated with the set of entity accounts identified in 504. In certain examples, the set of models include a bill level anomaly detection model (also referred to herein as a bill level model) and a bill line level anomaly detection model (also referred to herein as a bill line level model) identified by the bill level model trainer 304 and the bill line level model trainer 308 described in FIG. 3 for the set of entity accounts. In certain examples, information related to the bill level anomaly detection model and the bill line level anomaly detection model may be stored in data stores (e.g., 118, 120) of the BPS 102. The subsystems 210 and 212 then use the set of models to perform bill anomaly detection as described above.

FIG. 6-FIG. 9 depict various examples of bill verification reports generated by the bill verification subsystem of the BPS shown in FIG. 1, according to certain embodiments. The bill verification report for a bill may be generated, for instance, by the bill anomaly information aggregator subsystem 214 in the bill verification subsystem 106 shown in FIG. 2. The bill anomaly information aggregator subsystem 214 may then transmit the generated report to the bill verification report and final bill feedback system 126, which, in turn, may display the report to a user of the BPS 102 via a GUI of the bill verification report and final bill feedback system 126.

FIG. 6 depicts one example of a bill verification report generated by the bill verification subsystem of the BPS shown in FIG. 1, according to certain embodiments. In the depicted example, the bill verification report 600 provides information about anomalies detected at one or more bill lines in a bill 602 generated for a particular entity account (e.g., customer ABC Corp) 604. The bill verification report 600 additionally provides information about a cause of the anomalies detected at the bill lines. As previously described, each bill line may identify a product or service used by the entity account and is associated with an amount, where the amount may be determined upon the product's usage or consumption. In the example depicted in FIG. 6, a first detected anomaly includes an anomaly detected at a bill line item 606 (Outbound Domestic Wire Transfer) in the bill where the "transaction volume" of the bill line item is determined to be anomalous. The bill line anomaly may be detected, for instance, by the bill line level anomaly detection subsystem 212 by using a model for performing verification at the bill line level. For instance, as described in FIG. 3, the model may use historical data of product bill lines associated with bills to predict anomalies at the individual bill line level of the bill for the entity account. The bill verification report 600 additionally provides information about the cause 608 of the detected anomaly. In this example, the cause indicates that the amount is anomalous as per historical trend. A second detected anomaly shown in FIG. 6 indicates an anomaly detected at a different bill line item 610 (Returned Product) in the bill where the "transaction volume" of the bill line item is determined to be anomalous. The bill verification report 600 additionally displays information about the cause 612 of the detected anomaly that indicates that the volume is anomalous as per historical trend.

In certain examples, the bill verification report 600 may additionally provide status information 614 for the overall bill 602. The status information may indicate a cause of an anomaly detected at the overall bill level. In the depicted example, the cause indicates that the "Bill is anomalous due to anomaly at bill line level." The anomalies depicted in FIG. 6 are only examples of certain types of bill line level anomalies that can be shown via the UI of the user's device. In other examples, other types of bill line level anomalies not shown in the UI may also be provided to the user via the UI.

FIG. 7 depicts another example of a bill verification report generated by the bill verification subsystem of the BPS shown in FIG. 1, according to certain embodiments. In the depicted example, the bill verification report 700 provides bill level anomaly information that indicates that a bill 702 is anomalous at the overall bill level by identifying a missing product bill line "Outbound Domestic Wire Transfer," in a billing cycle of the bill. As previously described, a missing product bill line may be identified as an anomaly by the additional bill anomaly information detection subsystem 214 (shown in FIG. 2). For instance, the subsystem 214 may use a vector representation for the bill to identify any bill lines that are missing in the current bill record and identifies these occurrences as anomalies. The bill verification report 700 additionally provides information (i.e., a bill status 806) indicating that the cause of the detected anomaly is that the "Bill is anomalous as a regular billed Product "Outbound Domestic Wire Transfer" is missing." The anomaly depicted in FIG. 7 is only one example of a bill line level anomaly that can be shown via the UI of the user's device. In other examples, other types of bill line level anomalies not shown in the UI may also be provided to the user via the UI.

FIG. 8 depicts another example of a bill verification report generated by the bill verification subsystem of the BPS shown in FIG. 1, according to certain embodiments. In the depicted example, the bill verification report 800 provides bill level anomaly information that indicates that a bill 802 is anomalous at the overall bill level by identifying the addition of a new product bill line "Demand Draft Charges" in a billing cycle of the bill. The bill verification report 800 additionally provides information (i.e., a bill status 806) indicating that the cause of the detected anomaly is that the "Bill is anomalous as new product "Demand Draft Charges" got added in the bill." As described above, the addition of a new product in a bill could represent an anomalous scenario when, for instance, a similar charge product is added that replaces a regularly occurring product in a bill in a particular billing cycle. This may not be reflected in any of the product bill lines or at the overall bill level but may still represent an anomalous scenario because the similar charge product may not be a product that is typically expected to be included in the particular billing cycle. As previously described, these types of anomalies may be detected by the additional bill anomaly information detection subsystem 214 (shown in FIG. 2) by using a vector representation for the bill. The anomaly depicted in FIG. 8 is only one example of a bill line level anomaly that can be shown via the UI of the user's device. In other examples, other types of bill line level anomalies not shown in the UI may also be provided to the user via the UI.

FIG. 9 depicts another example of a bill verification report generated by the bill verification subsystem of the BPS shown in FIG. 1, according to certain embodiments. In the depicted example, the bill verification report 900 includes information regarding an anomaly detected at a particular product bill line 904 (Outbound Domestic Wire Transfer) in the bill. In this example, the bill verification subsystem determines that that the anomaly detected at bill line 904 is a seasonal variation because it represents an annually charged product in a particular billing cycle (e.g., during holiday season in the month of December) making this occurrence a seasonal exception. Since the same pattern is observed during this month every year, the bill verification system detects this occurrence as normal (i.e., not anomalous) and the bill verification report provides information (i.e., a bill status 908) indicating that the "Bill is normal as rise in Bill Amount and Bill Lines Amount is a seasonal occurring in the month of December." The anomaly depicted in FIG. 9 is only one type of example of a bill line level anomaly caused due to a seasonal variation can be shown via the UI of the user's device. In other examples, other types of bill line level anomalies not shown in the UI may also be provided to the user via the UI.

Example Implementation

Figure 10:
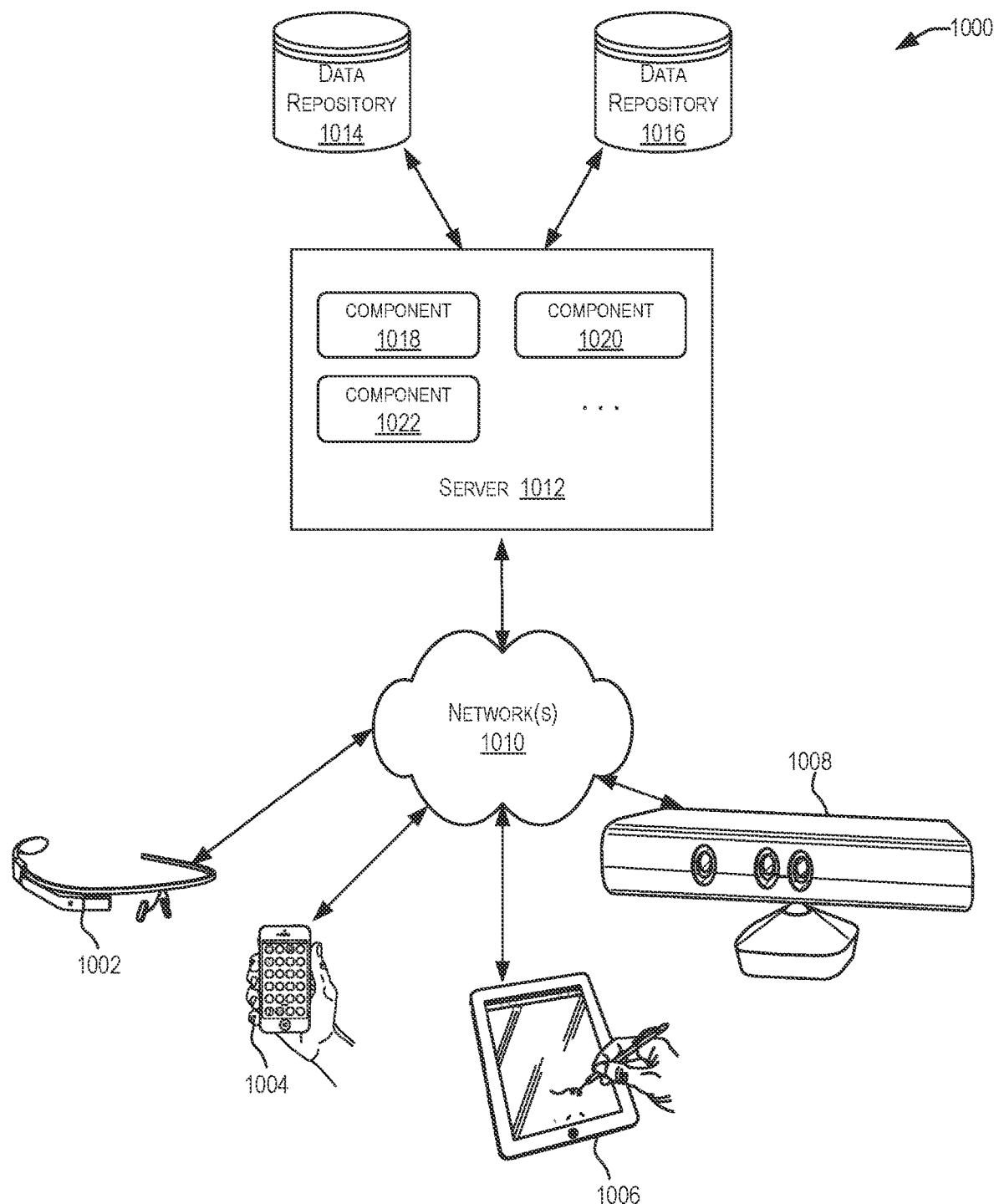
FIG. 10 depicts a simplified diagram of a distributed system for implementing an embodiment.

FIG. 10 depicts a simplified diagram of a distributed system 1000 for implementing an embodiment. In the illustrated embodiment, distributed system 1000 includes one or more client computing devices 1002, 1004, 1006, and 1008, coupled to a server 1012 via one or more communication networks 1010. Clients computing devices 1002, 1004, 1006, and 1008 may be configured to execute one or more applications.

In various embodiments, server 1012 may be adapted to run one or more services or software applications that enable the processing described in this disclosure.

In certain embodiments, server 1012 may also provide other services or software applications that can include non-virtual and virtual environments. In some embodiments, these services may be offered as web-based or cloud services, such as under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, server 1012 may include one or more components 1018, 1020 and 1022 that implement the functions performed by server 1012. These components may include software components that may be executed by one or more processors, hardware components, or combinations thereof. It should be appreciated that various different system configurations are possible, which may be different from distributed system 1000. The embodiment shown in FIG. 10 is thus one example of a distributed system for implementing an embodiment system and is not intended to be limiting.

Users may use client computing devices 1002, 1004, 1006, and/or 1008 to interact with server 1012 in accordance with the teachings of this disclosure. A client device may provide an interface that enables a user of the client device to interact with the client device. The client device may also output information to the user via this interface. Although FIG. 10 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1010 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1010 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 can include one or more virtual machines running virtual operating systems, or other computing architectures involving virtualization such as one or more flexible pools of logical storage devices that can be virtualized to maintain virtual storage devices for the server. In various embodiments, server 1012 may be adapted to run one or more services or software applications that provide the functionality described in the foregoing disclosure.

The computing systems in server 1012 may run one or more operating systems including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more data repositories 1014, 1016. These data repositories may be used to store data and other information in certain embodiments. For example, one or more of the data repositories 1014, 1016 may be used to store data or information generated by the processing described herein and/or data or information used for the processing described herein. Data repositories 1014, 1016 may reside in a variety of locations. For example, a data repository used by server 1012 may be local to server 1012 or may be remote from server 1012 and in communication with server 1012 via a network-based or dedicated connection. Data repositories 1014, 1016 may be of different types. In certain embodiments, a data repository used by server 1012 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 1014, 1016 may also be used by applications to store application data. The data repositories used by applications may be of different types such as, for example, a key-value store repository, an object store repository, or a general storage repository supported by a file system.

Figure 11:
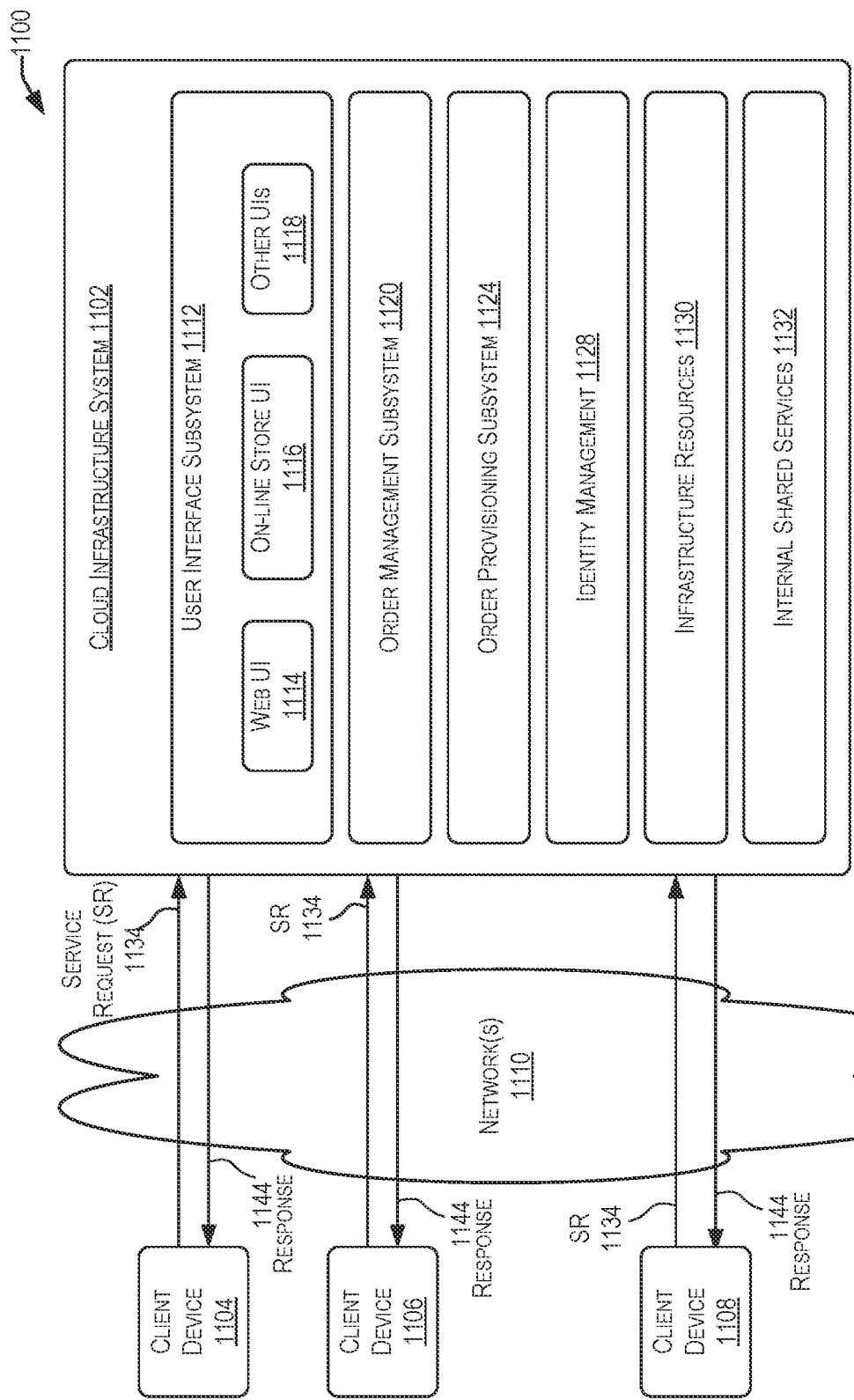
FIG. 11 is a simplified block diagram of a cloud-based system environment in which functionalities described herein may be offered as cloud services, in accordance with certain embodiments.

In certain embodiments, the bill verification services described in this disclosure may be offered as services via a cloud environment. FIG. 11 is a simplified block diagram of a cloud-based system environment in which functionalities described herein may be offered as cloud services, in accordance with certain embodiments. In the embodiment depicted in FIG. 11, cloud infrastructure system 1102 may provide one or more cloud services that may be requested by users using one or more client computing devices 1004, 1106, and 1108. Cloud infrastructure system 1102 may comprise one or more computers and/or servers that may include those described above for server 1012. The computers in cloud infrastructure system 1102 may be organized as general purpose computers, specialized server computers, server farms, server clusters, or any other appropriate arrangement and/or combination.

Network(s) 1110 may facilitate communication and exchange of data between clients 1104, 1106, and 1108 and cloud infrastructure system 1102. Network(s) 1110 may include one or more networks. The networks may be of the same or different types. Network(s) 1110 may support one or more communication protocols, including wired and/or wireless protocols, for facilitating the communications.

The embodiment depicted in FIG. 11 is only one example of a cloud infrastructure system and is not intended to be limiting. It should be appreciated that, in some other embodiments, cloud infrastructure system 1102 may have more or fewer components than those depicted in FIG. 11, may combine two or more components, or may have a different configuration or arrangement of components. For example, although FIG. 11 depicts three client computing devices, any number of client computing devices may be supported in alternative embodiments.

The term cloud service is generally used to refer to a service that is made available to users on demand and via a communication network such as the Internet by systems (e.g., cloud infrastructure system 1102) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 1102 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1102 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1102. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1102. Cloud infrastructure system 1102 then performs processing to provide the services requested in the customer's subscription order. Cloud infrastructure system 1102 may be configured to provide one or even multiple cloud services.

Cloud infrastructure system 1102 may provide the cloud services via different deployment models. In a public cloud model, cloud infrastructure system 1102 may be owned by a third party cloud services provider and the cloud services are offered to any general public customer, where the customer can be an individual or an enterprise. In certain other embodiments, under a private cloud model, cloud infrastructure system 1102 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 1102 and the services provided may be shared by several organizations in a related community. Various other models such as hybrids of the above mentioned models may also be used.

Client computing devices 1104, 1106, and 1108 may be of different types (such as devices 1002, 1004, 1006, and 1008 depicted in FIG. 1) and may be capable of operating one or more client applications. A user may use a client device to interact with cloud infrastructure system 1102, such as to request a service provided by cloud infrastructure system 1102.

In some embodiments, the processing performed by cloud infrastructure system 1102 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 11, cloud infrastructure system 1102 may include infrastructure resources 1130 that are utilized for facilitating the provision of various cloud services offered by cloud infrastructure system 1102. Infrastructure resources 1130 may include, for example, processing resources, storage or memory resources, networking resources, and the like.

In certain embodiments, to facilitate efficient provisioning of these resources for supporting the various cloud services provided by cloud infrastructure system 1102 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1102 may itself internally use services 1132 that are shared by different components of cloud infrastructure system 1102 and which facilitate the provisioning of services by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1102 may comprise multiple subsystems. These subsystems may be implemented in software, or hardware, or combinations thereof. As depicted in FIG. 11, the subsystems may include a user interface subsystem 1112 that enables users or customers of cloud infrastructure system 1102 to interact with cloud infrastructure system 1102. User interface subsystem 1112 may include various different interfaces such as a web interface 1114, an online store interface 1116 where cloud services provided by cloud infrastructure system 1102 are advertised and are purchasable by a consumer, and other interfaces 1118. For example, a customer may, using a client device, request (service request 1134) one or more services provided by cloud infrastructure system 1102 using one or more of interfaces 1114, 1116, and 1118. For example, a customer may access the online store, browse cloud services offered by cloud infrastructure system 1102, and place a subscription order for one or more services offered by cloud infrastructure system 1102 that the customer wishes to subscribe to. The service request may include information identifying the customer and one or more services that the customer desires to subscribe to.

In certain embodiments, such as the embodiment depicted in FIG. 11, cloud infrastructure system 1102 may comprise an order management subsystem (OMS) 1120 that is configured to process the new order. As part of this processing, OMS 1120 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1120 may then invoke the order provisioning subsystem (OPS) 1124 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1124 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 1102 may send a response or notification 1144 to the requesting customer to indicate when the requested service is now ready for use. In some instances, information (e.g., a link) may be sent to the customer that enables the customer to start using and availing the benefits of the requested services.

Cloud infrastructure system 1102 may provide services to multiple customers. For each customer, cloud infrastructure system 1102 is responsible for managing information related to one or more subscription orders received from the customer, maintaining customer data related to the orders, and providing the requested services to the customer. Cloud infrastructure system 1102 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1102 may provide services to multiple customers in parallel. Cloud infrastructure system 1102 may store information for these customers, including possibly proprietary information. In certain embodiments, cloud infrastructure system 1102 comprises an identity management subsystem (IMS) 1128 that is configured to manage customers information and provide the separation of the managed information such that information related to one customer is not accessible by another customer. IMS 1128 may be configured to provide various security-related services such as identity services, such as information access management, authentication and authorization services, services for managing customer identities and roles and related capabilities, and the like.

Figure 12:
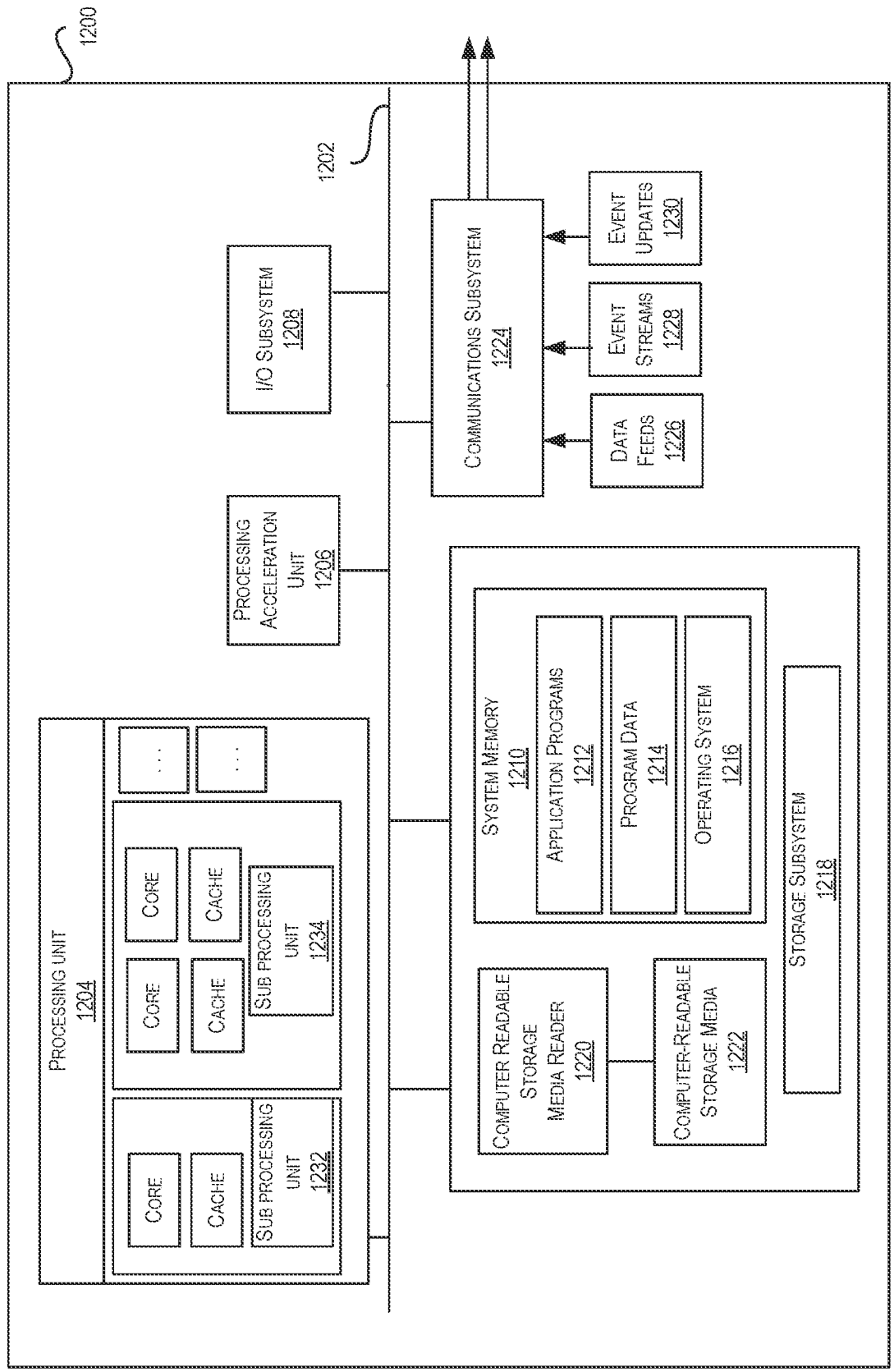
FIG. 12 illustrates an exemplary computer system that may be used to implement certain embodiments.

FIG. 12 illustrates an exemplary computer system 1200 that may be used to implement certain embodiments. For example, in some embodiments, computer system 1200 may be used to implement any of the system and subsystems for performing processing according to the present disclosure. As shown in FIG. 12, computer system 1200 includes various subsystems including a processing subsystem 1204 that communicates with a number of other subsystems via a bus subsystem 1202. These other subsystems may include a processing acceleration unit 1206, an I/O subsystem 1208, a storage subsystem 1218, and a communications subsystem 1224. Storage subsystem 1218 may include non-transitory computer-readable storage media including storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1204 controls the operation of computer system 1200 and may comprise one or more processors, application specific integrated circuits (ASICs), or field programmable gate arrays (FPGAs). The processors may include single core or multicore processors. The processing resources of computer system 1200 can be organized into one or more processing units 1232, 1234, etc. A processing unit may include one or more processors, one or more cores from the same or different processors, a combination of cores and processors, or other combinations of cores and processors. In some embodiments, processing subsystem 1204 can include one or more special purpose co-processors such as graphics processors, digital signal processors (DSPs), or the like. In some embodiments, some or all of the processing units of processing subsystem 1204 can be implemented using customized circuits, such as application specific integrated circuits (ASICs), or field programmable gate arrays (FPGAs).

In some embodiments, the processing units in processing subsystem 1204 can execute instructions stored in system memory 1210 or on computer readable storage media 1222. In various embodiments, the processing units can execute a variety of programs or code instructions and can maintain multiple concurrently executing programs or processes. At any given time, some or all of the program code to be executed can be resident in system memory 1210 and/or on computer-readable storage media 1222 including potentially on one or more storage devices. Through suitable programming, processing subsystem 1204 can provide various functionalities described above. In instances where computer system 1200 is executing one or more virtual machines, one or more processing units may be allocated to each virtual machine.

In certain embodiments, a processing acceleration unit 1206 may optionally be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term input device is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 860 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1200 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information and data that is used by computer system 1200. Storage subsystem 1218 provides a tangible non-transitory computer-readable storage medium for storing the basic programming and data constructs that provide the functionality of some embodiments. Storage subsystem 1218 may store software (e.g., programs, code modules, instructions) that when executed by processing subsystem 1204 provides the functionality described above. The software may be executed by one or more processing units of processing subsystem 1204. Storage subsystem 1218 may also provide a repository for storing data used in accordance with the teachings of this disclosure.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM), dynamic random access memory (DRAM), and the like.

By way of example, and not limitation, as depicted in FIG. 12, system memory 1210 may load application programs 1212 that are being executed, which may include various applications such as Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1222 may store programming and data constructs that provide the functionality of some embodiments. Computer-readable media 1222 may provide storage of computer-readable instructions, data structures, program modules, and other data for computer system 1200. Software (programs, code modules, instructions) that, when executed by processing subsystem 1204 provides the functionality described above, may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1218 may also include a computer-readable storage media reader 1220 that can further be connected to computer-readable storage media 1222. Reader 1220 may receive and be configured to read data from a memory device such as a disk, a flash drive, etc.

In certain embodiments, computer system 1200 may support virtualization technologies, including but not limited to virtualization of processing and memory resources. For example, computer system 1200 may provide support for executing one or more virtual machines. In certain embodiments, computer system 1200 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1200. Accordingly, multiple operating systems may potentially be run concurrently by computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices.

Communication subsystem 1224 may support both wired and/or wireless communication protocols. For example, in certain embodiments, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

Communication subsystem 1224 can receive and transmit data in various forms. For example, in some embodiments, in addition to other forms, communications subsystem 1224 may receive input communications in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to communicate data from computer system 1200 to other computer systems or networks. The data may be communicated in various different forms such as structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims. Various modifications and equivalents include relevant, appropriate combination of features disclosed in the embodiments.

What is claimed is:

1. A method comprising:

receiving, by a bill processing system implemented using one or more computing systems, a request to verify a bill record associated with an entity account, the bill record stored in a memory of the bill processing system;

identifying, by the bill processing system, a bill level machine learning (ML) model to be used for verifying the bill record, the bill level ML model trained using a training algorithm and historical data comprising historical bills and associated bill level features;

detecting, by the bill processing system, based at least in part on the bill level ML model, bill level anomaly information for the bill record based on a spatial distribution of the historical data learned by the bill level model using the training algorithm and the bill record, wherein the bill level anomaly information comprises information about an anomaly detected in the bill record;

identifying, by the bill processing system, a bill line level ML model to be used for verifying one or more bill lines in the bill record, the bill line level ML model trained using the training algorithm, the historical data comprising the historical bills and associated bill line level features, wherein the training algorithm includes a supervised learning training algorithm or an unsupervised learning training algorithm;

detecting, by the bill processing system, based at least in part on the bill line level ML model, bill line level anomaly information for the bill record based on the spatial distribution of the historical data learned by the bill line level model using the training algorithm and the bill record, wherein the bill line level anomaly information comprises information about an anomaly detected at a bill line in the bill record;

receiving, by the bill processing system, a vector representation for verifying the bill record, the vector representation identifying a set of products that are expected to be included in a billing cycle of the bill record;

identifying, by the bill processing system, additional anomaly information associated with the bill record based on the vector representation;

aggregating, by the bill processing system, the bill level anomaly information detected by the bill level ML model, the bill line level anomaly information detected by the bill line level ML model, and the additional anomaly information to generate a bill verification report for the bill record;

providing, by the bill processing system, the bill verification report as a response to the request received to verify the bill record, the bill verification report identifying the additional anomaly information associated with the bill record, wherein the additional anomaly information identifies a product that is not in the set of products identified in the vector representation;

analyzing, by a feedback system that is communicatively coupled to the bill processing system, the bill verification report for the bill record; and providing, by the feedback system, a result of the analysis, in real-time, to a training system used by the bill processing system to train a set of ML models for verifying a set of bill records associated with a set of entity accounts, wherein the set of ML models include at least the bill level ML model to be used for verifying the set of bill records and the bill line level ML model to be used for verifying the set of bill records.

2. The method of claim 1, wherein:
the additional anomaly information identifies at least one of one or more missing bill lines in the bill record or one or more incorrectly added bill lines in the bill record.

3. The method of claim 2, wherein the vector representation is a count of a set of products subscribed to by a set of users associated with the entity account.

4. The method of claim 1, wherein the bill level anomaly information further comprises information about a cause of the detected anomaly and if the detected anomaly was caused due to a seasonal variation.

5. The method of claim 1, wherein the bill line level anomaly information further comprises information about a cause of the detected anomaly at the bill line and if the detected anomaly at the bill line was caused due to a seasonal variation, wherein the bill line identifies a product or a service used by the entity account.

6. The method of claim 1, wherein identifying, by the bill processing system, the bill level ML model to be used for verifying the bill record comprises:
identifying a set of entity accounts that are similar to the entity account associated with the bill record; and
identifying the bill level ML model to be used for verifying the bill record based on the set of entity accounts.

7. The method of claim 1, wherein identifying, by the bill processing system, the bill line level ML model to be used for verifying the bill record comprises:
identifying a set of entity accounts that are similar to the entity account associated with the bill record; and
identifying the bill line level ML model to be used for verifying the bill record based on the set of entity accounts.

8. The method of claim 7, wherein the set of entity accounts are identified by clustering one or more entity accounts based on usage patterns, product subscriptions, regions, usage volumes and billing amount ranges in a set of bill records processed by the bill processing system for the one or more entity accounts.

9. The method of claim 1, wherein the entity account represents at least one of an organization that subscribes to a set of services provided by the bill processing system for performing bill verification or an individual user of the organization.

10. A bill processing system comprising:
a memory; and
one or more processors configured to perform processing, the processing comprising:
receiving a request to verify a bill record associated with an entity account, the bill record stored in the memory of the bill processing system;
identifying a bill level machine learning (ML) model to be used for verifying the bill record, the bill level ML model trained using a training algorithm and historical data comprising historical bills and associated bill level features;
detecting based at least in part on the bill level ML model, bill level anomaly information for the bill record based on a spatial distribution of the historical data learned by the bill level model using the training algorithm and the bill record, wherein the bill level anomaly information comprises information about an anomaly detected in the bill record;
identifying a bill line level ML model to be used for verifying one or more bill lines in the bill record, the bill line level ML model trained using the training algorithm, the historical data comprising the historical bills and associated bill line level features, wherein the training algorithm includes a supervised learning training algorithm or an unsupervised learning training algorithm;
detecting based at least in part on the bill line level ML model, bill line level anomaly information for the bill record based on a spatial distribution of the historical data learned by the bill line level model using the training algorithm and the bill record, wherein the bill line level anomaly information comprises information about an anomaly detected at a bill line in the bill record;
receiving, by the bill processing system, a vector representation for verifying the bill record, the vector representation identifying a set of products that are expected to be included in a billing cycle of the bill record;
identifying, by the bill processing system, additional anomaly information associated with the bill record based on the vector representation;
aggregating the bill level anomaly information detected by the bill level ML model, the bill line level anomaly information detected by the bill line level ML model, and the additional anomaly information to generate a bill verification report for the bill record;
providing the bill verification report as a response to the request received to verify the bill record, the bill verification report identifying the additional anomaly information associated with the bill record, wherein the additional anomaly information identifies a product that is not in the set of products identified in the vector representation;
analyzing, by a feedback system that is communicatively coupled to the bill processing system, the bill verification report for the bill record; and
providing, by the feedback system, a result of the analysis, in real-time, to a training system used by the bill processing system to train a set of ML models for verifying a set of bill records associated with a set of entity accounts, wherein the set of ML models include at least the bill level ML model to be used for verifying the set of bill records and the bill line level ML model to be used for verifying the set of bill records.

11. The system of claim 10, wherein the additional anomaly information identifies at least one of one or more missing bill lines in the bill record or one or more incorrectly added bill lines in the bill record.

12. The system of claim 11, wherein the vector representation is a count of a set of products subscribed to by a set of users associated with the entity account.

13. The system of claim 10, wherein the bill level anomaly information further comprises information about a cause of the detected anomaly and if the detected anomaly was caused due to a seasonal variation.

14. The system of claim 10, wherein the bill line level anomaly information further comprises information about a cause of the detected anomaly at the bill line and if the detected anomaly at the bill line was caused due to a seasonal variation, wherein the bill line identifies a product or a service used by the entity account.

15. A non-transitory computer-readable medium having program code that is stored thereon, the program code executable by one or more processing devices for performing operations comprising:

receiving a request to verify a bill record associated with an entity account, the bill record stored in a memory of the one or more processing devices;

identifying a bill level machine learning (ML) model to be used for verifying the bill record, the bill level ML model trained using a training algorithm and historical data comprising historical bills and associated bill level features;

detecting based at least in part on the bill level ML model, bill level anomaly information for the bill record based on a spatial distribution of the historical data learned by the bill level model using the training algorithm and the bill record, wherein the bill level anomaly information comprises information about an anomaly detected in the bill record;

identifying a bill line level ML model to be used for verifying one or more bill lines in the bill record, the bill line level ML model trained using the training algorithm, the historical data comprising the historical bills and associated bill line level features, wherein the training algorithm includes a supervised learning training algorithm or an unsupervised learning training algorithm;

detecting based at least in part on the bill line level ML model, bill line level anomaly information for the bill record based on a spatial distribution of the historical data learned by the bill line level model using the training algorithm and the bill record, wherein the bill line level anomaly information comprises information about an anomaly detected at a bill line in the bill record;

receiving, by the bill processing system, a vector representation for verifying the bill record, the vector representation identifying a set of products that are expected to be included in a billing cycle of the bill record;

identifying, by the bill processing system, additional anomaly information associated with the bill record based on the vector representation;

aggregating the bill level anomaly information detected by the bill level ML model, the bill line level anomaly information detected by the bill line level ML model, and the additional anomaly information to generate a bill verification report for the bill record; and providing the bill verification report as a response to the request received to verify the bill record, the bill verification report identifying the additional anomaly information associated with the bill record, wherein the additional anomaly information identifies a product that is not in the set of products identified in the vector representation;

analyzing, by a feedback system that is communicatively coupled to the bill processing system, the bill verification report for the bill record; and providing, by the feedback system, a result of the analysis, in real-time, to a training system used by the bill processing system to train a set of ML models for verifying a set of bill records associated with a set of entity accounts, wherein the set of ML models include at least the bill level ML model to be used for verifying the set of bill records and the bill line level ML model to be used for verifying the set of bill records.

16. The non-transitory computer-readable medium of claim 15, wherein identifying a bill level ML model to be used for verifying the bill record comprises:

identifying a set of entity accounts that are similar to the entity account associated with the bill record; and identifying the bill level ML model to be used for verifying the bill record based on the set of entity accounts.

17. The non-transitory computer-readable medium of claim 15, wherein the entity account represents at least one of an organization that subscribes to a set of services provided by a bill processing system for performing bill verification or an individual user of the organization.

* * * * *

UNITED STATES PATENT AND TRADEMARK OFFICE
CERTIFICATE OF CORRECTION

PATENT NO. : 12,333,585 B2
APPLICATION NO. : 17/710745
DATED : June 17, 2025
INVENTOR(S) : Yadav et al.

Page 1 of 1

It is certified that error appears in the above-identified patent and that said Letters Patent is hereby corrected as shown below:

In the Specification

In Column 1, Line 59, delete "that that" and insert -- that --, therefor.

In Column 3, Line 58, delete "that that" and insert -- that --, therefor.

In Column 7, Line 3, delete "and or" and insert -- and/or --, therefor.

In Column 9, Line 18, delete "cycle" and insert -- cycle. --, therefor.

In Column 16, Line 34, delete "that that" and insert -- that --, therefor.

Signed and Sealed this
Ninth Day of December, 2025

John A. Squires
*Director of the United States Patent and Trademark Office*